United States Patent
Phogat et al.

(10) Patent No.: US 10,051,558 B2
(45) Date of Patent: Aug. 14, 2018

(54) WI-FI SCAN OPERATION ON A DYNAMIC FREQUENCY SELECTION MASTER DUAL BAND SIMULTANEOUS DEVICE

(71) Applicant: QUALCOMM Incorporated, San Diego, CA (US)

(72) Inventors: Vikram Phogat, San Jose, CA (US); Ravi Gidvani, Fremont, CA (US); Gerald Stanton, Franktown, CO (US); Dagbegnon Henri Bahini, San Diego, CA (US); Kumar Anand, Santa Clara, CA (US); Tushnim Bhattacharyya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/148,066

(22) Filed: May 6, 2016

(65) Prior Publication Data
US 2017/0325158 A1 Nov. 9, 2017

(51) Int. Cl.
*H04W 48/16* (2009.01)
*H04L 29/12* (2006.01)
*H04W 72/10* (2009.01)
*H04B 7/0413* (2017.01)
(Continued)

(52) U.S. Cl.
CPC .......... *H04W 48/16* (2013.01); *H04B 7/0413* (2013.01); *H04L 61/6022* (2013.01); *H04W 72/10* (2013.01); *H04W 74/0816* (2013.01); *H04W 84/12* (2013.01)

(58) Field of Classification Search
CPC ..... H04W 48/16; H04W 72/10; H04W 84/12; H04L 61/6022
See application file for complete search history.

(56) References Cited

U.S. PATENT DOCUMENTS 8,320,833 B2 11/2012 Lee et al.
9,143,349 B2 9/2015 Bry et al.
(Continued)

OTHER PUBLICATIONS

ISA/EP, International Search Report and Written Opinion of the International Searching Authority, Int'l Application No. PCT/US2017/023137, Jun. 30, 2017, European Patent Office, Rijswijk, NL, 13 pgs.

*Primary Examiner* — Christine Ng
(74) *Attorney, Agent, or Firm* — Holland & Hart LLP/Qualcomm (57) ABSTRACT

Methods, systems, and devices for wireless communication are described. An access point (AP) transmits instructions to quiet a dynamic frequency selection (DFS) home channel for a period of time. Instructions can include a quiet information element (IE) or a clear-to-send to self (CTS2Self) frame. The AP then allocates a first dedicated RF chain to a first media access control (MAC) component and a second dedicated RF chain, separate from the first dedicated RF chain, to a second MAC component of the access point. The allocation can include reducing the number of RF chains dedicated to the first MAC component. During the time period determined by the instructions, the first dedicated RF chain scans the home DFS channel and the second dedicated RF chain scans at least one other channel (e.g., based at least in part on the time period and channel scan priority) in the same band as the DFS home channel.

26 Claims, 8 Drawing Sheets

(51) Int. Cl.
*H04W 74/08* (2009.01)
*H04W 84/12* (2009.01)

(56) References Cited

U.S. PATENT DOCUMENTS

| | | | |
|---|---|---|---|
| 2007/0099584 A1* | 5/2007 | Niu | H04B 7/04 |
| | | | 455/101 |
| 2007/0126622 A1* | 6/2007 | Nallapureddy | G01S 7/021 |
| | | | 342/92 |
| 2007/0149230 A1 | 6/2007 | Song et al. | |
| 2013/0039298 A1* | 2/2013 | Park | H04W 16/14 |
| | | | 370/329 |
| 2013/0158934 A1* | 6/2013 | Lee | H04L 41/22 |
| | | | 702/122 |
| 2013/0314267 A1 | 11/2013 | Kenney et al. | |
| 2014/0295912 A1* | 10/2014 | Lee | H04W 88/06 |
| | | | 455/552.1 |
| 2014/0376392 A1* | 12/2014 | Hegde | H04W 48/16 |
| | | | 370/252 |
| 2015/0110058 A1 | 4/2015 | Shapira | |
| 2017/0034755 A1* | 2/2017 | Casebolt | H04W 36/06 |
| 2017/0041954 A1* | 2/2017 | Tsai | H04W 16/14 |

* cited by examiner

FIG. 8

WI-FI SCAN OPERATION ON A DYNAMIC FREQUENCY SELECTION MASTER DUAL BAND SIMULTANEOUS DEVICE

BACKGROUND

The following relates generally to wireless communication, and more specifically to Wi-Fi scanning on a dynamic frequency selection (DFS) master dual band simultaneous (DBS) device.

Wireless communications systems are widely deployed to provide various types of communication content such as voice, video, packet data, messaging, broadcast, and so on. These systems include multiple-access systems capable of supporting communication with multiple users by sharing the available system resources (e.g., time, frequency, and power). A wireless network, for example a wireless local area network (WLAN), such as a Wi-Fi (i.e., IEEE 802.11) network includes an access point (AP) that communicates with one or more stations (STAs) or mobile devices. The AP can be coupled to a network, such as the Internet, to enable a mobile device to communicate via the network (or communicate with other devices coupled to the access point). A wireless device communicates with a network device bi-directionally. For example, in a WLAN, a STA communicates with an associated AP via downlink (DL) and uplink (UL). The DL (or forward link) refers to the communication link from the AP to the STA, and the UL (or reverse link) refers to the communication link from the STA to the AP.

Isolation refers to a degree of attenuation from an unwanted signal at a port of interest. Lack of isolation can result in unwanted influence of signals from other channels, reducing the integrity of the measured signal and increasing system measurement uncertainties. A DBS device without sufficient isolation between RF chains has reduced transmission and reception success on both channels, specifically for higher frequency signals. That is, once the device begins functioning as an AP (e.g., via beaconing) on a DFS channel (e.g., a 5 GHz channel), the AP can only effectively scan limited channels (e.g., 2.4 GHz channels) in addition to the AP's DFS home channel.

SUMMARY

An access point (AP) may not have enough isolation between radio frequency (RF) chains to effectively perform off channel scans in a band while simultaneously functioning as a dynamic frequency selection (DFS) AP in the same band. To perform off channel scanning, the AP transmits instructions to quiet a DFS home channel for a period of time. Instructions include a quiet information element (IE) or a clear-to-send to self (CTS2Self) frame. The AP then allocates a separate dedicated RF chain to two media access control (MAC) components. The allocation often includes reducing the number of RF chains dedicated to the first MAC component. During the time period the DFS home channel is silenced, the first MAC component scans the home DFS channel and the second MAC component scans at least one other channel in the same band as the DFS home channel. The number of channels scanned by the second MAC component is often based at least in part on the silenced time period in addition to a scan priority associated with each of the channels of the number of channels. At the end of the silenced time period, the AP stops scanning and reallocates RF chains back to the first MAC component.

A method of wireless communication is described. The method includes transmitting an instruction to quiet a DFS home channel for a specified period of time, allocating a first dedicated RF chain to a first MAC component of the access point and a second dedicated RF chain, separate from the first dedicated RF chain, to a second MAC component of the access point, scanning the home DFS channel using the first dedicated RF chain during the specified period of time and scanning one or more other channels in a same band as the DFS home channel using the second dedicated RF chain during the specified period of time.

An apparatus for wireless communication is described. The apparatus includes means for transmitting an instruction to quiet a DFS home channel for a specified period of time, means for allocating a first dedicated RF chain to a first MAC component of the access point and a second dedicated RF chain, separate from the first dedicated RF chain, to a second MAC component of the access point, means for scanning the home DFS channel using the first dedicated RF chain during the specified period of time and means for scanning one or more other channels in a same band as the DFS home channel using the second dedicated RF chain during the specified period of time.

A further apparatus is described. The apparatus includes a processor, memory in electronic communication with the processor, and instructions stored in the memory. The instructions are be operable to cause the processor to transmit an instruction to quiet a DFS home channel for a specified period of time, allocate a first dedicated RF chain to a first MAC component of the access point and a second dedicated RF chain, separate from the first dedicated RF chain, to a second MAC component of the access point, scan the home DFS channel using the first dedicated RF chain during the specified period of time and scan one or more other channels in a same band as the DFS home channel using the second dedicated RF chain during the specified period of time.

A non-transitory computer readable medium for wireless communication is described. The non-transitory computer-readable medium includes instructions to cause a processor to transmit an instruction to quiet a DFS home channel for a specified period of time, allocate a first dedicated RF chain to a first MAC component of the access point and a second dedicated RF chain, separate from the first dedicated RF chain, to a second MAC component of the access point, scan the home DFS channel using the first dedicated RF chain during the specified period of time and scan one or more other channels in a same band as the DFS home channel using the second dedicated RF chain during the specified period of time.

Some examples of the method, apparatus, or non-transitory computer-readable medium described above further include processes, features, means, or instructions for determining a number of channels to scan during the specified period of time based at least in part on the specified period of time and a scan priority associated with each of the channels of the number of channels. In some examples of the method, apparatus, or non-transitory computer-readable medium described above, determining the number of channels to scan is further based at least in part on a traffic latency parameter of the DFS home channel. In some examples of the method, apparatus, or non-transitory computer-readable medium described above, allocating the first dedicated RF chain to the first MAC component includes reducing a number of RF chains allocated to the first MAC component.

Some examples of the method, apparatus, or non-transitory computer-readable medium described above further include processes, features, means, or instructions for discontinuing the scanning of the one or more other channels in the same band as the DFS home channel at the end of the specified time frame. Some examples of the method, apparatus, or non-transitory computer-readable medium described above further include processes, features, means, or instructions for reallocating the second dedicated RF chain to the first MAC component.

Some examples of the method, apparatus, or non-transitory computer-readable medium described above further include processes, features, means, or instructions for discontinuing data transmissions by the access point on the DFS home channel during the specified time period. In some examples of the method, apparatus, or non-transitory computer-readable medium described above, the instruction is from the group consisting of: a quiet IE and a CTS2Self frame.

In some examples of the method, apparatus, or non-transitory computer-readable medium described above, a scan timing of the home DFS channel and the one or more other channels in the same band as the DFS channel are synchronized. Some examples of the method, apparatus, or non-transitory computer-readable medium described above further include processes, features, means, or instructions for returning to a distributed coordination function mode of operation at the conclusion of the specified period of time.

DETAILED DESCRIPTION

The beaconing of a dynamic frequency selection (DFS) access point (AP) on a DFS home channel of a band (e.g., a 5 GHz band) can result in unreliable scanning of other channels in the same band. Additionally, transmissions by the AP on the DFS channel can interfere with simultaneous receive operations for a different channel of the same band. This interference limits the AP's capability to perform both passive and active scans on other channels.

To address these and other issues, a DFS AP controls transmissions on one MAC component to allow scanning on a second MAC component to continue without interference. That is, the AP controls or stops transmissions (e.g., both its own transmission and transmissions from remotely STAs) on the DFS channel while the AP remains on the DFS channel to actively detect radar and synchronize the scan timing on the second MAC-PHY-RF chain. The AP signals or broadcasts a quiet information element (IE) or clear to send(CTS)-to-self (CTS2Self) frame to silence transmissions on a DFS home channel for the duration of active and/or passive scans (e.g., a single channel scan or multiple channel scans, depending on scan priority and efficiency). That is, the AP can use the quiet IE to silence all STAs that are connected to the AP by informing all connected STAs to not transmit to the AP (e.g., remain quiet on the DFS home channel), or alternatively can transmit a CTS2Self frame to reserve the medium and block traffic on the DFS home channel.

Whether quiet IE or CTS2Self frame is used to quiet the medium is determined by traffic load on the DFS home channel and time constraints on the number of channels to be scanned. Quiet IE is used to perform channel scanning for time periods longer than a maximum network allocation vector (NAV) set by a CTS2Self frame. That is, quiet IE provides for more efficient channel scanning, but is associated with more overhead due to the time associated with advertising to STAs and beginning the scanning. A CTS2Self frame can be used when scanning off channel (i.e. on a channel other than the DFS home channel) for short durations (e.g., durations not exceeding the maximum NAV of a CTS2Self frame). After transmitting the quiet IE or CTS2Self frame, the AP allocates a separate RF chain to each of the two MAC components to enable the scanning.

Aspects of the disclosure are initially described in the context of a wireless communication system. Configurations for off DFS channel scanning and examples of wireless systems supporting off DFS channel scanning are then described. Aspects of the disclosure are further illustrated by and described with reference to apparatus diagrams, system diagrams, and flowcharts that relate to Wi-Fi scanning on a DFS master dual band simultaneous (DBS) device.

Figure 1:
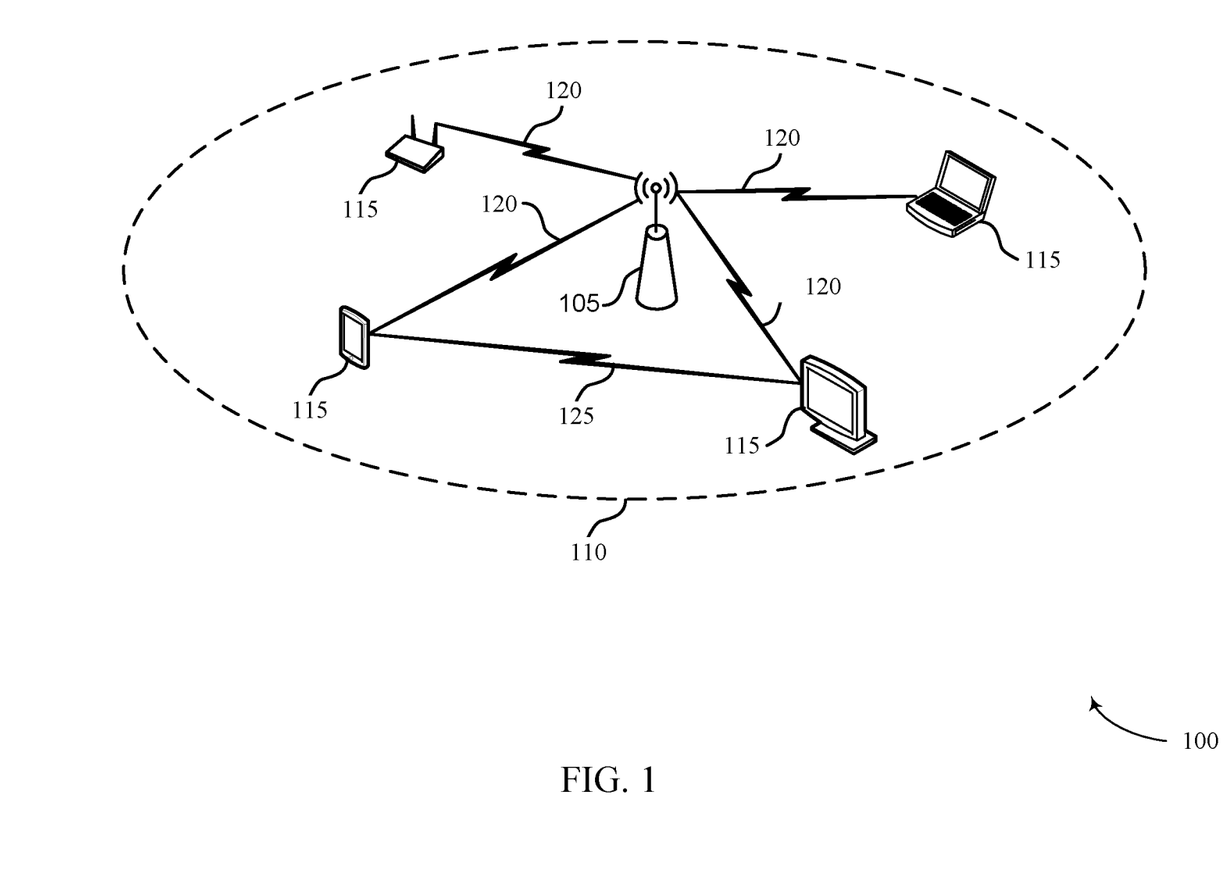
FIG. 1 illustrates an example of a wireless communications system that supports Wi-Fi scanning on a DFS master DBS device in accordance with aspects of the present disclosure.

FIG. 1 illustrates a wireless local area network (WLAN) 100 (e.g., a Wi-Fi network) configured in accordance with various aspects of the present disclosure. The WLAN 100 includes an AP 105 and multiple associated STAs 115, which represents devices such as mobile stations, personal digital assistant (PDAs), other handheld devices, netbooks, notebook computers, tablet computers, laptops, display devices (e.g., TVs, computer monitors, etc.), printers, etc. In some cases, a STA 115 acts as an AP 105 if configured as a soft AP. A soft AP is a STA with software enabling the STA that is not a dedicated router or AP, to function as a wireless AP or virtual router. For example, a soft AP can function as a DFS AP. The APs 105 shown in FIG. 1 can be implemented as dedicated APs, and/or soft APs.

The AP 105 and the associated stations 115 often represent a basic service set (BSS) or an extended service set (ESS). The various STAs 115 in the network are able to communicate with one another through the AP 105. Also shown is a coverage area 110 of the AP 105, which represents a basic service area (BSA) of the WLAN 100. An extended network station (not shown) associated with the WLAN 100 can be connected to a wired or wireless distribution system that allows multiple APs 105 to be connected in an ESS.

Although not shown in FIG. 1, a STA 115 might be located in the intersection of more than one coverage area 110 and associate with more than one AP 105. A single AP 105 and an associated set of STAs 115 are often referred to as a BSS. An ESS is a set of connected BSSs. A distribution system (not shown) is used to connect APs 105 in an ESS. In some cases, the coverage area 110 of an AP 105 is often divided into sectors (also not shown). The WLAN network 100 includes APs 105 of different types (e.g., metropolitan area, home network, etc.), with varying and overlapping coverage areas 110. Two STAs 115 can also communicate directly via a direct wireless link 125 regardless of whether both STAs 115 are in the same coverage area 110. Examples of direct wireless links 120 include Wi-Fi Direct connections, Wi-Fi Tunneled Direct Link Setup (TDLS) links, and other group connections. STAs 115 and APs 105 communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks are implemented within WLAN network 100.

A DBS device (e.g., AP 105) supports Single Band Simultaneous (SBS) operation (e.g., 5 GHz SBS operation) on 2 different channels. Often times, DBS devices do not have enough isolation between radio frequency (RF) chains to reliably support simultaneous transmission and reception on both channels (e.g., transmission on one channel and reception on another channel). Therefore, an AP 105 supporting SBS operation and operating on a home DFS channel may have limited opportunities to scan other channels in the same band as the DFS home channel.

Beaconing on the DFS home channel by the AP 105 interferes with the ability of the AP 105 to scan other channels in the same band as the DFS home channel. Similarly, transmissions by the AP 105 on the DFS home channel can interfere with receive operations on another channel in the same band as the DFS home channel, which in turn limits the capability of the AP 105 to perform passive and active scans on other channels (e.g., other 5 GHz channels). Active scans in the same band as the DFS home channel further impact data transmissions on the DFS home channel of the AP 105, as transmitting on one MAC-PHY-RF chain of the AP 105 might affect receive operations on a second MAC-PHY-RF chain operating in the same band.

In some cases, the AP 105 performs time division multiplexing to allow the AP 105 to go off of the DFS home channel and scan other channels. Each time the AP 105 goes off the DFS home channel to perform scans (e.g., 40 msec for an active scan and 120 msec for a passive scan), the AP 105 is unable to detect radars on its home channel and, in some cases, can violate regulatory requirements. The amount of time during which the AP 105 is off channel can be approximated as, $$\begin{aligned} \text{total scan time} \cong \quad & \text{(1)} \\ \text{active scan dwell time} * \text{number of active scan channels} + \\ \text{passive dwell time} * \text{number of passive scan channels} + \\ \text{channel switch time} * \text{number of scan channels} * 2 \end{aligned}$$

To address this issue, the AP 105 transmits an instruction to quiet the DFS home channel for a specified period of time (e.g., a NAV of a CTS2Self frame or a duration specified by a quiet IE). The AP 105 allocates a first dedicated RF chain to a first media access control (MAC) component implementing a first MAC layer and a second MAC component implementing a second MAC layer. The AP then scans the home DFS channel using the first dedicated RF chain during the specified period of time and scans one or more other channels in the same band as the DFS home channel using the second dedicated RF chain during the specified period of time.

Figure 2:
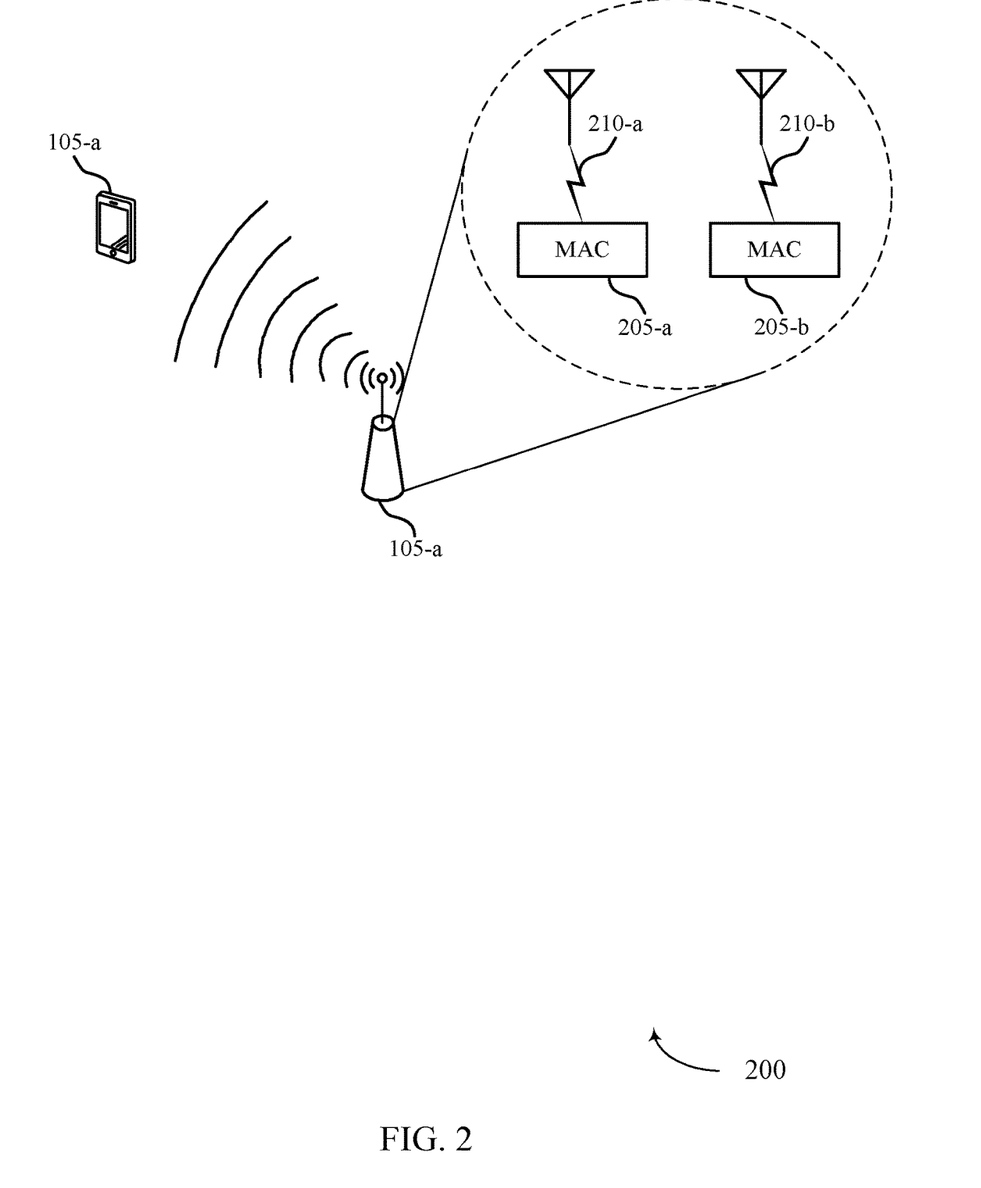
FIG. 2 illustrates an example of a wireless communications system that supports Wi-Fi scanning on a DFS master DBS device in accordance with aspects of the present disclosure.

FIG. 2 illustrates an example of a wireless communications system 200 for Wi-Fi scanning on a DFS master DBS device. Wireless communications system 200 includes AP 105-a (e.g., an SBS device operating on a DFS home channel) and STA 115-a, which are examples of the corresponding devices described with reference to FIG. 1. Wireless communications system 200 represents a system that supports Wi-Fi scanning by AP 105-a.

AP 105-a controls transmissions on one MAC component 205-a to allow scanning on a second MAC component 205-b to continue without interference. Each MAC component 205-a represents a separate implementation of media access control (MAC) layer operations. That is, AP 105-a controls or stops transmissions (e.g., both its own transmission and remotely connected STA transmissions (e.g., STA 115-a)) on the DFS channel while AP 105-a remains on the DFS channel to actively detect radar and synchronize the scan timing on the second MAC-PHY-RF chain. As the first MAC component 205-a of AP 105-a will not have any transmissions, the scanning on the second MAC component 205-b continues without any interference. Software methods utilizing a CTS2Self frame or a quiet information element (IE) are used to overcome hardware limitations that could otherwise require costly filters between two RF chains allocated to two different MAC layers in SBS mode.

AP 105-a transmits (e.g., broadcasts) a quiet IE or CTS2Self frame to silence transmissions on a DFS home channel for the duration of active and/or passive scans (e.g., a single channel scan or multiple channel scans, depending on scan priority and efficiency). That is, the AP 105-a uses quiet IE to silence all STAs (e.g., STA 115-a) that are connected to the AP 105-a, or alternatively transmits a CTS2Self frame to block traffic on the DFS home channel. Traffic on the home channel is silenced or blocked for the duration of the off channel scan. The AP 105-a sends the CTS2Self frame to ensure the medium is idle such that no transmissions from STA 115-a are directed to the AP 105-a during the time period that AP 105-a wishes to perform the scanning. However, because the network allocation vector (NAV) set by a CTS2Self frame is limited in duration (e.g., 32765 micro seconds), and is effectively used for shorter duration channel scans. The CTS2Self frame can be repeated multiple times for multiple scans, which are faster but less efficient than using quiet IE.

Traffic load and time constraints on the number of channels to be scanned determines whether quiet IE or CTS2Self frame is to be used. Quiet IE is used to perform channel scanning for time periods longer than the maximum NAV of a CTS2Self frame. That is, quiet IE provides for more efficient channel scanning, but takes longer due to time needed to advertise to all communicating STAs and begin the scanning. For example, quiet IE is used when efficiency is desired such as for full channel scans or when AP 105-a goes off channel for a longer duration when the data or traffic load on the home channel is low. A CTS2Self frame is used when scanning off channel for short durations (e.g., durations not exceeding a maximum NAV of aCTS2Self frame). For example, a CTS2Self frame is used when speed is desired such as for location scanning or when the AP 105-a can only scan off channel for short durations. Multiple channels are scanned (e.g., a burst scan based at least in part on scan priority) in one iteration for better scan efficiency. The number of channels scanned, and scan dwell time, are limited based at least in part on traffic latency requirements of AP 105-a.

After signaling quiet IE or CTS2Self frame, AP 105-*a* allocates a separate RF chain 210 to each of the two MAC components 205 and enters a mute mode. That is, AP 105-*a* allocates RF chain 210-*a* to MAC component 205-*a* and allocates RF chain 210-*b* to MAC component 205-*b*. During the scan duration (e.g., a quiet IE or CTS2Self NAV duration), the AP 105-*a* transitions to a mute mode or listen mode where all transmissions (e.g., including frame acknowledgements (ACKs)) on the DFS home channel are stopped. In mute mode, AP 105-*a* uses RF chain 210-*a* to remain on the DFS home channel and continue radar detection, but AP 105-*a* will not transmit on the home channel. If the device has a limited number of RF chains 210 available and both the MAC components 205 are sharing RF chains 210 (e.g., MAC component 205-*a* and MAC component 205-*b* both share RF chain 210-*a* and RF chain 210-*b*), then the number of RF chains 210 allocated to MAC component 205-*a* (e.g., the DFS AP MAC component) can be reduced such that the MAC component 205-*a* and the MAC component 205-*b* each have at least one separate RF chain 210. A RF chain 210-*b* is configured to MAC component 205-*b* (e.g., the channel scanning MAC component) to enable active scanning or passive scanning on other channels (e.g., 5 GHz or 2.4 GHz channels). Prior to the end of the quiet IE duration (or scan duration), AP 105-*a* stops scanning on the current scan channel and restores the number of RF chains 210 to the MAC component 205-*a*. The process outlined above is repeated until all desired channels have been scanned. In some cases, CTS2Self frames and/or quiet IEs are signaled periodically for periodic mute modes to allow for additional channel scans.

Figure 3:
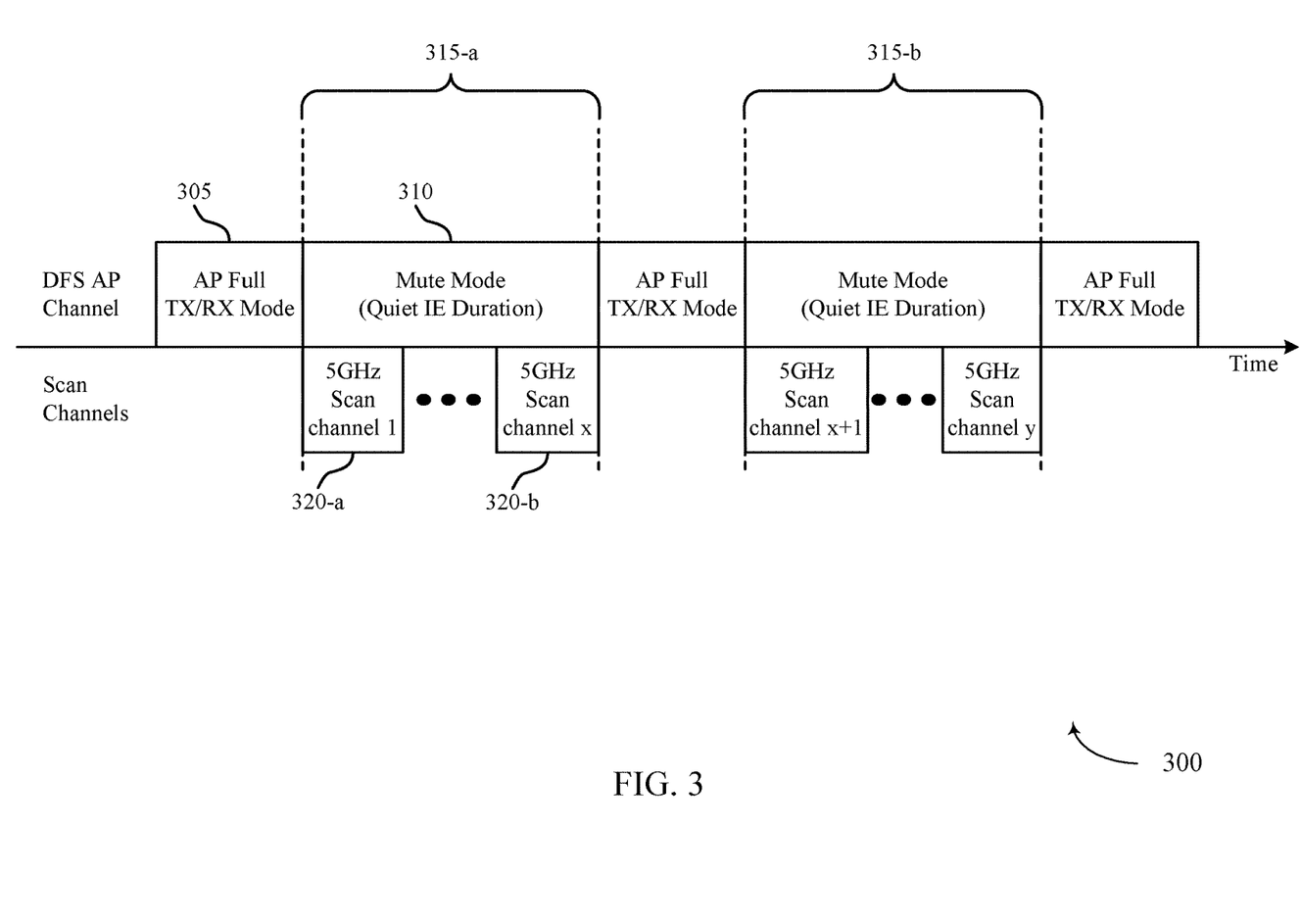
FIG. 3 illustrates an example of a scanning configuration that supports Wi-Fi scanning on a DFS master DBS device in accordance with aspects of the present disclosure.

FIG. 3 illustrates an example of a scanning configuration 300 for Wi-Fi scanning on a DFS master DBS device. Scan configuration 300 represents aspects of techniques performed by an AP 105 or a STA 115 as described with reference to FIGS. 1-2.

An AP 105 can be in a full TX/RX mode 305 where the AP 105 is transmitting and receiving on the DFS home channel. While in the full TX/RX mode 305, the AP 105 signals instructions to a STA 115 to quiet or silence transmissions on the DFS home channel for a specified duration. The specified duration corresponds to a scan duration 315. In some cases, the full TX/RX mode 305 is a distributed coordination function (DCF) mode.

The AP 105 then enters a mute mode 310 for a scan duration 315. To enter mute mode, an AP 105 can reduce the number of RF chains on a first MAC component if the RF chains are shared. That is, the AP 105 allocates a separate RF chain to two MAC components. During mute mode 310, the AP 105 delays transmissions (including ACKs) on the DFS home channel. A channel availability check (CAC) is performed during the mute mode 310 to monitor for radar interference (e.g., detect radar). Further, the AP 105 performs channel scans 320 during the scan duration 315. A scan duration 315 is indicated in quieting instructions sent to STAs 115 during a full TX/RX mode 305. The scan duration 315 includes either a quiet IE or CTS2Self NAV duration.

For example, while in mute mode 310 during a scan duration 315, an AP 105 performs a channel scan 320-*a* (e.g., scan channel 1) and continues to scan channels until channel scan 320-*b* (e.g., the scan of channel x) is performed, after which the AP 105 exits the mute mode 310. Following a mute mode 310, the AP 105 reenters the full TX/RX mode 305 (e.g., a). Additional channels needed to be scanned (e.g., channel x+1 though channel y) are scanned at the next mute mode 310 (e.g., during scan duration 315-*b*). Channel x+1 though channel y might need to be scanned at the next mute mode 310 due to the time duration to scan all channels (e.g., channel 1 through channel y) exceeding the scan duration 315-*a*. In some examples mute modes 310 occur periodically to accommodate for a larger number of channels to be scanned in scenarios where shorter scan durations 315 are called for.

Figure 4:
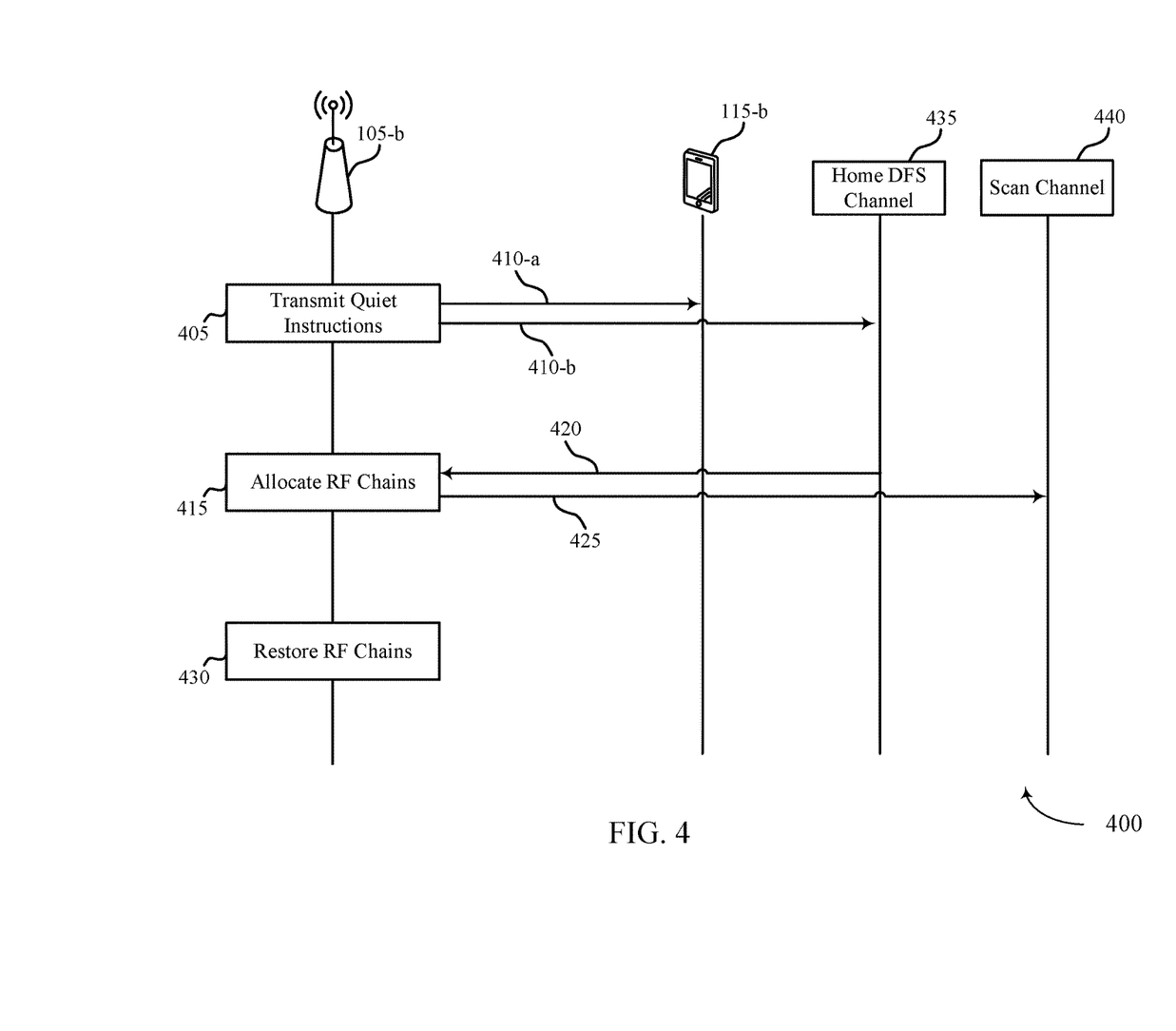
FIG. 4 illustrates an example of a process flow in a system that supports Wi-Fi scanning on a DFS master DBS device in accordance with aspects of the present disclosure.

FIG. 4 illustrates an example of a process flow 400 for Wi-Fi scanning on a DFS master DBS device in accordance with various aspects of the present disclosure. Process flow 400 includes AP 105-*b* and STA 115-*b* which are examples of the corresponding devices described with reference to FIG. 1-2.

At block 405, AP 105-*b* transmits an instruction 410 to quiet a DFS home channel 435 for a specified period of time. That is, an AP 105-*b* transmits instruction 410 to silence STA 115-*b* transmissions on the DFS home channel. Instructions 410 to silence transmissions on the DFS home channel are sent to all STAs 115 that AP 105-*b* serves. The instruction 410 may include a quiet IE or a CTS2Self frame. AP 105-*b* can further discontinue transmissions on the DFS home channel 435 for the specified period of time.

At block 415, AP 105-*b* allocates MAC layer RF chains such that a separate RF chain is dedicated to two MAC components of the AP 105-*b*. In some cases, the allocation includes reducing the number of RF chains allocated to a first MAC component. The home DFS channel 435 is scanned via the RF chain of the first MAC component, while at least one other channel (e.g., scan channel 440) is scanned via the RF chain of the second MAC component. Scan channel 440 is a channel in the same band as the DFS home channel 435 and the scan timings can be synchronized in time. The number of channels to scan using the second MAC component is determined based at least in part on the specified period of time from block 405, a scan priority associated with each of the channels of the number of channels, and/or a traffic latency parameter of the DFS home channel 435.

At block 430, AP 105-*b* stops scanning channel 440 and restores the RF chains to the first MAC component. The restoring includes reallocating the reduced RF chains of block 415 back to the first MAC component. Further, AP 105-*b* returns to a distributed coordination function mode of operation at the conclusion of the specified time period from block 405.

Alternative examples of the foregoing can be implemented, wherein certain blocks are performed in a different order or not at all. Certain blocks may include additional features not mentioned above. For example, AP 105-*a* transmits quiet instructions to additional STAs 115 not pictured, AP 105-*a* scans addition channels not pictured, or the AP 105-*a* does not restore the RF chains to the first MAC component.

Figure 5:
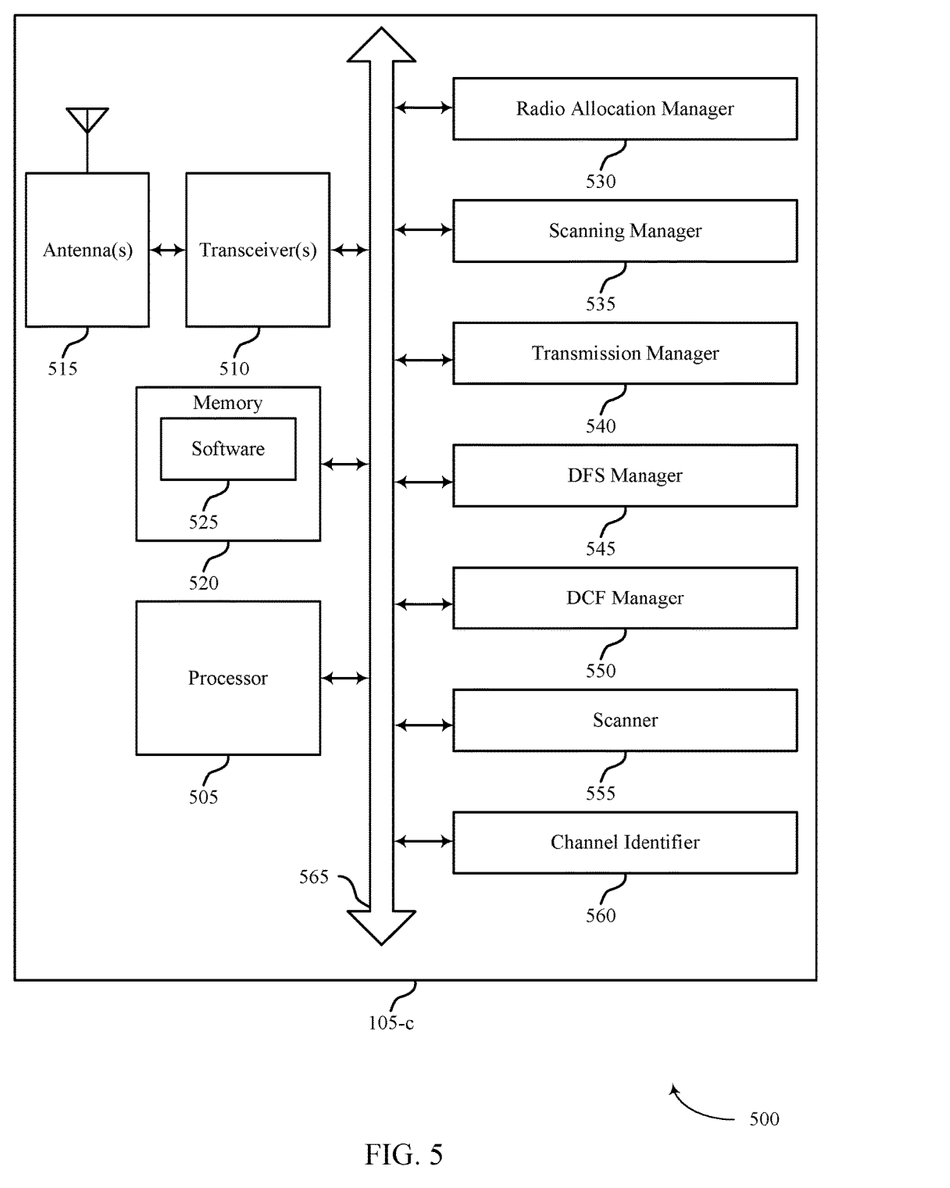
FIGS. 5 and 6 illustrate block diagrams of a system including an access point that supports Wi-Fi scanning on a DFS master DBS device in accordance with aspects of the present disclosure.

FIG. 5 shows a block diagram 500 of an example AP 105-*c* that supports Wi-Fi scanning on an AP 105-*c* operating as a DFS master DBS device in accordance with various aspects of the present disclosure, and with respect to FIGS. 1-4. The AP 105-*c* includes processor 505, one or more transceivers 510, one or more antennas 515, memory 520, radio allocation manager 530, scanning manager 535, transmission manager 540, DFS manager 545, DCF manager 550, scanner 555, and a channel identifier 560. The processor 505, transceiver(s) 510, antenna(s) 515, memory 520, radio allocation manager 530, scanning manager 535, transmission manager 540, DFS manager 545, DCF manager 550, scanner 555, and a channel identifier 560 are communicatively coupled with a bus 565, which enables communication between these components. The antenna(s) 515 are communicatively coupled with the transceiver(s) 510.

The processor 505 is an intelligent hardware device (e.g., a central processing unit (CPU), a microcontroller, an application specific integrated circuit (ASIC), etc.). The processor 505 processes information received through the transceiver(s) 510 and information to be sent to the transceiver(s) 510 for transmission through the antenna(s) 515.

The memory 520 (e.g., random access memory (RAM) and read only memory (ROM)) stores computer-readable, computer-executable software (SW) code 525 containing instructions that, when executed, cause the processor 505 or another one of the components of AP 105-c to perform various functions described herein (e.g., Wi-Fi scanning on a DFS master DBS device, etc.). In some cases, the software 525 is not to be directly executable by the processor but still causes a computer (e.g., when compiled and executed) to perform functions described herein.

The transceiver(s) 510 communicate bi-directionally, via one or more antennas, wired, or wireless links, with one or more networks, as described above. That is, the transceiver(s) 510 communicate bi-directionally with other wireless devices such as APs 105, STAs 115, or other devices. The transceiver(s) 510 include a modem to modulate packets and frames and provide the modulated packets to the antenna(s) 515 for transmission. The modem is additionally used to demodulate packets received from the antenna(s) 515.

The radio allocation manager 530, scanning manager 535, transmission manager 540, DFS manager 545, DCF manager 550, scanner 555 and channel identifier 560 each can communicate, directly or indirectly, with one another (e.g., via one or more buses) and implement the features described with reference to FIGS. 1-4, as further explained below.

Again, FIG. 5 shows only one possible implementation of a device executing the features of FIGS. 1-4. While the components of FIG. 5 are shown as discrete hardware blocks (e.g., ASICs, field programmable gate arrays (FPGAs), semi-custom integrated circuits, etc.) for purposes of clarity, it will be understood that each of the components can also be implemented by multiple hardware blocks adapted to execute some or all of the applicable features in hardware. Alternatively, features of two or more of the components of FIG. 5 can be implemented by a single, consolidated hardware block. For example, a single transceiver 510 chip can implement the processor 505, memory 520, radio allocation manager 530, scanning manager 535, transmission manager 540, DFS manager 545, DCF manager 550, scanner 555, and a channel identifier 560.

Figure 6:
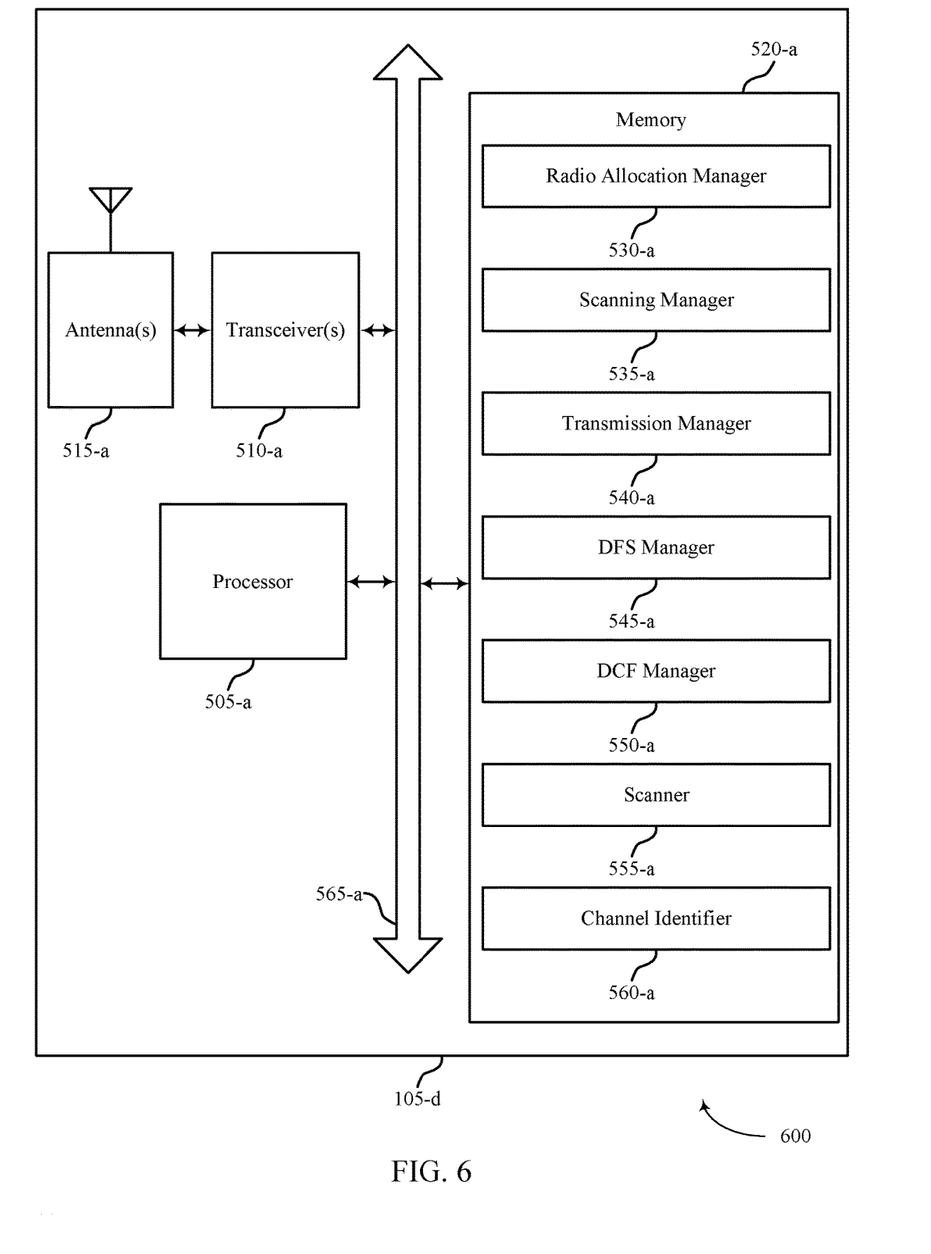

In still other examples, the features of each component can also be implemented, in whole or in part, with instructions embodied in a memory, formatted to be executed by one or more general or application-specific processors. For example, FIG. 6 shows a block diagram 600 of another example of an AP 105-d in which the features of the radio allocation manager 530-a, scanning manager 535-a, transmission manager 540-a, DFS manager 545-a, DCF manager 550-a, scanner 555-a, and a channel identifier 560-a are implemented as computer-readable code stored on memory 565-a and executed by one or more processors 505-a. Other combinations of hardware/software can be used to perform the features of one or more of the components of FIGS. 5-6.

AP 105-d also includes processor 505-a, one or more transceivers 510-a, one or more antennas 615, and memory 520-a. The processor 505-a includes an intelligent hardware device, (e.g., a CPU, a microcontroller, an ASIC, etc.) The memory 520-a often includes RAM and/or ROM. The memory 520-a stores computer-readable, computer-executable software including instructions that, when executed, cause the processor to perform various functions described herein (e.g., Wi-Fi scanning on a DFS master DBS device, etc.).

The transceiver(s) 510-a communicates bi-directionally, via one or more antennas, wired, or wireless links, with one or more networks, as described above. For example, the transceiver(s) 510-a communicates bi-directionally with an AP 105 or an STA 115. The transceiver(s) 510-a also includes a modem to modulate the packets and provide the modulated packets to the antenna(s) 515-a for transmission, and to demodulate packets received from the antennas. In some cases, the wireless device includes a single antenna 515-a. In other cases, the device has more than one antennas 515-a, which are capable of concurrently transmitting or receiving multiple wireless transmissions.

The memory 520-a includes radio allocation manager 520-a, scanning manager 535-a, transmission manager 540-a, DFS manager 545-a, DCF manager 550-a, scanner 555-a, and channel identifier 560-a. Each of these modules may perform functions described below with reference to FIGS. 7-8.

Figure 7:
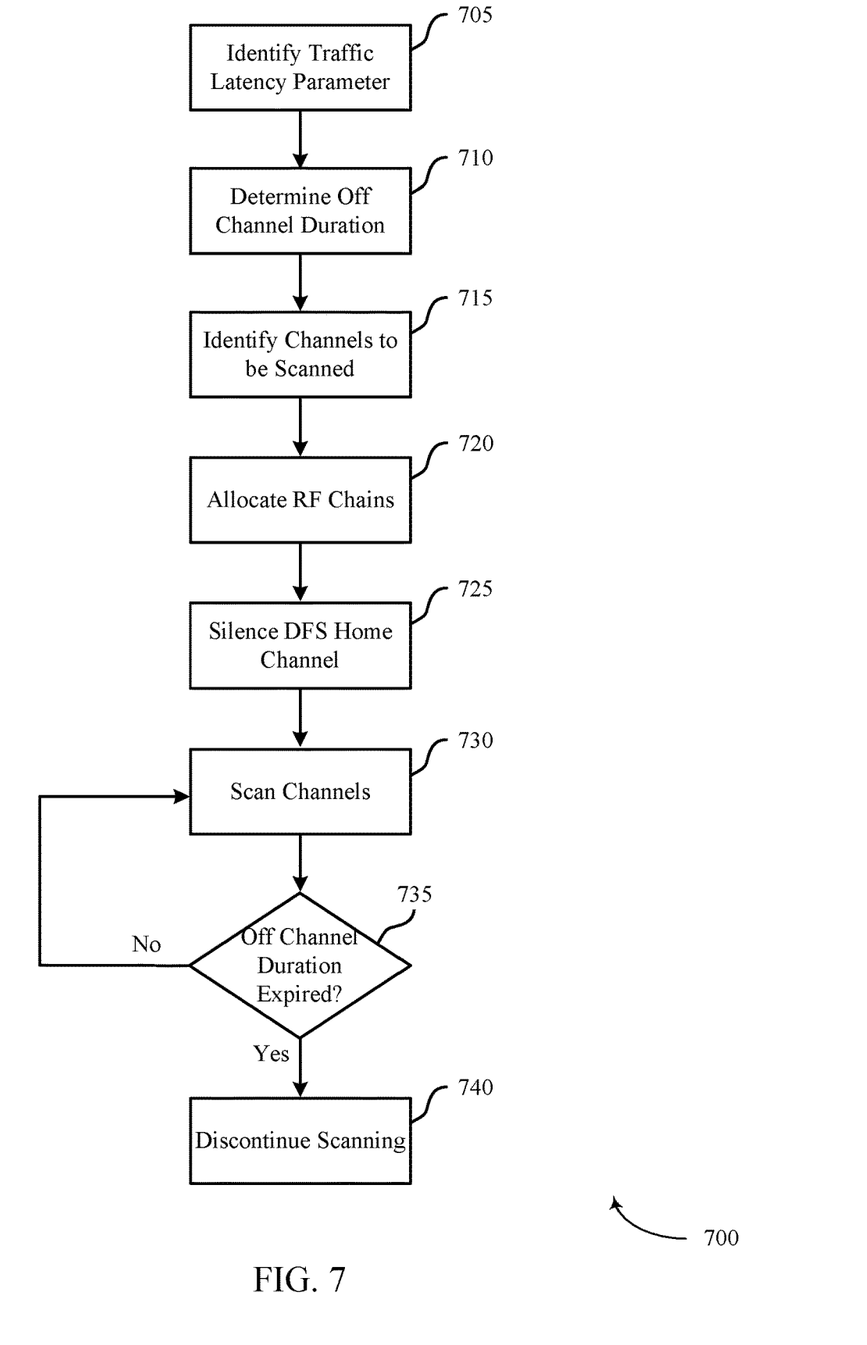
FIGS. 7 and 8 illustrate methods for Wi-Fi scanning on a DFS master DBS device in accordance with aspects of the present disclosure.

FIG. 7 shows a flowchart that illustrates one example of a method 700 for Wi-Fi scanning on a DFS master DBS device, in accordance with various aspects of the present disclosure. The operations of method 700 are implemented by a device such as an AP 105 or its components as described with reference to the previous Figures. For ease of explanation, the operations of method 700 are described with reference to AP 105-c or 105-d of FIGS. 5-6. In some examples, the AP 105-c or AP 105-d executes a set of codes to control the functional elements of the device to perform the functions described below. Additionally or alternatively, the AP 105-c or AP 105-d can perform aspects of the functions described below using special-purpose hardware.

Broadly speaking, the method 700 illustrates a procedure by which the AP 105-c or AP 105-d determines an off channel duration, allocates separate RF chains to two MAC components, and scans channels based at least in part on the determined off channel duration.

The method 700 begins with the AP 105-c or AP 105-d operating in a network or BSS. At block 705, the antenna(s) 515, transceiver(s) 510, and/or processor 505 identifies a channel latency parameter. The channel latency parameter is a parameter describing the amount and type of traffic on the DFS home channel. That is, different types of traffic such as voice (e.g., VoIP), video, and data have different reliability and latency requirements (e.g., quality of service (QoS) requirements). The channel latency parameter, in some cases, can also be based on the amount of traffic on the DFS home channel.

At block 710, the processor 505 and/or software 520 determines an off channel duration. The off channel duration refers to a specified period of time that the DFS home channel is silenced or transmissions on the DFS home channel are stopped. The off channel duration is based on the channel latency parameter determined at block 705. Subsequently, at block 715, channel identifier 560 identifies a number of channels to scan during the off channel duration. The identified number of channels can be based on the amount of channels that can be scanned within the off channel duration.

At block 720, the radio allocation manager 530 allocates separate RF chains to two MAC components. The allocation often includes the radio allocation manager 530 reducing the number of RF chains on a first MAC component, and reallocating them to a second MAC component. Alternatively, in some examples the radio allocation manager 530 can allocate the separate RF chains after the DFS home channel is silenced as described below.

At block 725, the transmissions manager 540 silences transmissions on the DFS home channel for the off channel duration determined in block 710. While the home channel is silenced, the DFS Manager 545 uses the first MAC component to continue radar detection on the DFS home channel. At block 730, the scanner 555 scans channels in the same band as the DFS channel for the off channel duration. The scanner 555 can utilize the second MAC component RF chain for scanning the channels.

At block 735, the processor 505 is in communication with the scanning manager 535 to determine when the off channel duration has expired. If the duration has not expired, the scanner 555 continues to scan channels as described at block 730 until all the channels determined in block 710 are scanned. The channels are scanned either randomly, or based at least in part on an order described by a scanning priority determined by the scanning manager 535. If the off channel duration has expired, the scanning manager 535 stops the scanner 555 from scanning at block 740.

Figure 8:
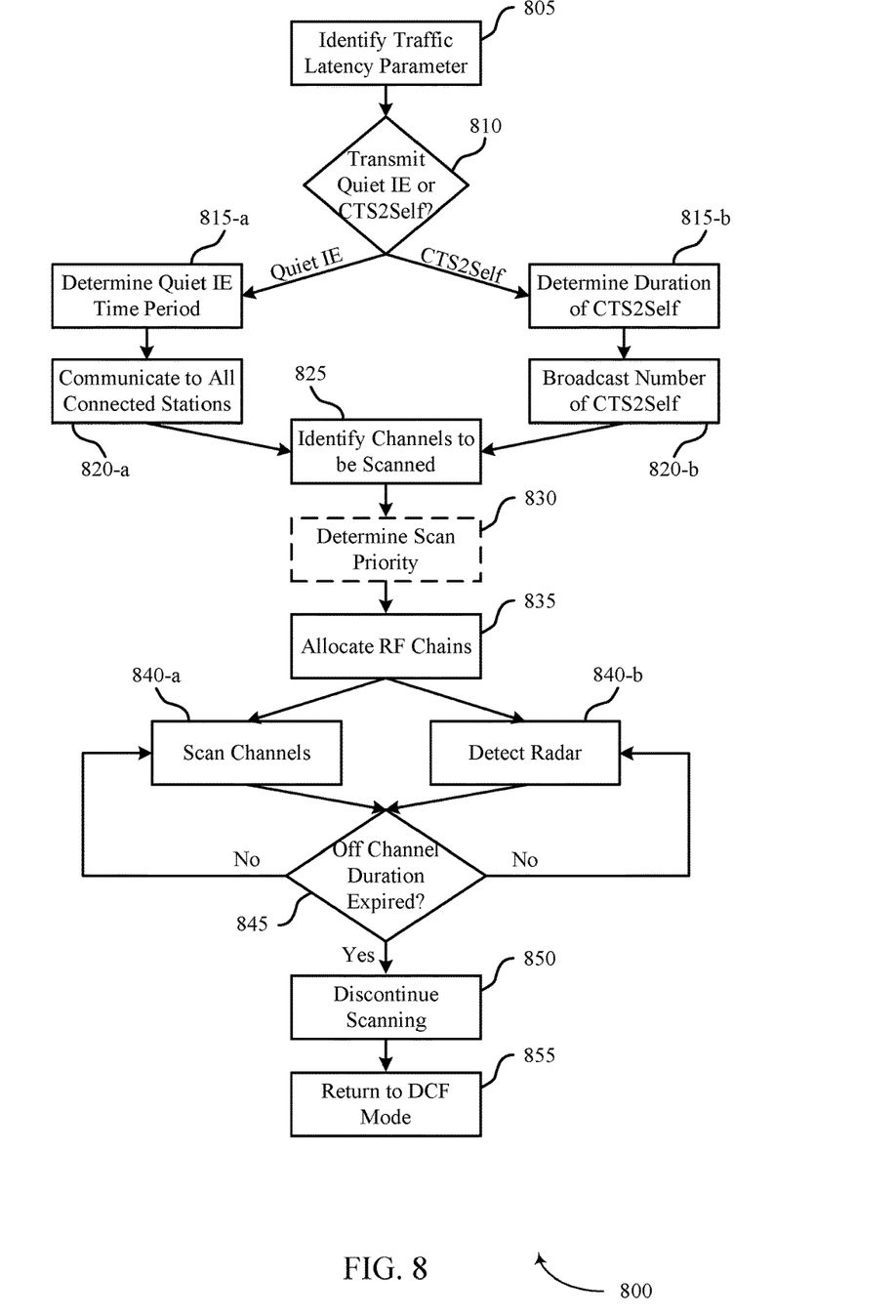

FIG. 8 shows a flowchart illustrating a method 800 for Wi-Fi scanning on a DFS master DBS device in accordance with various aspects of the present disclosure. The operations of method 800 are implemented by a device such as an AP 105 or its components as described with reference to the previous Figures. For ease of explanation, the operations of method 800 are described with reference to AP 105-*c* or 105-*d* of FIGS. 5-6. In some examples, the AP 105-*c* or AP 105-*d* executes a set of codes to control the functional elements of the device to perform the functions described below. Additionally or alternatively, the AP 105-*c* or AP 105-*d* can perform aspects the functions described below using special-purpose hardware.

Broadly speaking, the method 800 illustrates a procedure by which the AP 105-*c* or AP 105-*d* determines an off channel duration, allocates separate RF chains to two MAC components, and scans channels off channels based at least in part on the determined off channel duration.

At block 805, the channel latency parameter is identified as described in FIG. 7. At block 810, the processor 505, software 525, and/or DFS manager 545 determine whether to transmit a quiet IE or a CTS2Self frame to silence the DFS home channel. The determination is based on the channel latency parameter. For example, if the channel latency parameter indicates a low traffic load on the DFS home channel, the DFS manager 545 can transmit a CTS2Self frame. Alternatively if the channel latency parameter indicates a high traffic load on the DFS home channel, the DFS manager 545 can transmit a quiet IE. As another example, a quiet IE is transmitted when the channel latency parameter indicates latency requirements associated with traffic on the DFS channel allow for off channel scanning for a duration exceeding the NAV duration of a CTS2Self frame. A CTS2Self frame is transmitted when traffic on the DFS channel has low latency requirements (e.g., VoIP), and when the AP 105-*c* or AP 105-*d* can only scan off channel for shorter durations.

At block 815-*a*, the DFS manager 545 determines the duration of the off channel scan duration to be indicated by the quiet IE transmission. The quiet IE is then communicated to all STAs 115 connected to the AP 105-*c* or AP 105-*d* at block 820-*a*. The communications associated with block 820-*a* can take longer than broadcasting a CTS2Self frame, which is one example of why quiet IE is used for longer off channel durations as described above with reference to block 810.

At block 815-*b*, the DFS manager 545 determines a duration of CTS2Self NAVs that fit in the determined off channel duration. Often times, the duration of CTS2Self NAVs that fit in the off channel duration is one. The determined duration of CTS2Self NAVs that fit in the off channel duration are transmitted one after another (e.g., if more than one fit in the off channel duration) to silence transmissions on the DFS home channel for the off channel duration at block 820-*b*.

At block 825, the channels to be scanned during the off channel duration are identified as described with reference to FIG. 7. The channel identifier 560 determines a number of channels to scan during the specified period of time based at least in part on the specified period of time and a scan priority associated with each of the channels of the number of channels. In some cases, determining of the number of channels to scan is further based at least in part on a traffic latency parameter of the DFS home channel.

Optionally, at block 830, a scan priority is determined by the scanning manager 535 and/or the processor 505 to define an ordering of each of the identified number of channels to be scanned in a sequential order. The channel scans of block 840-*a* are performed according to the scan priority. At block 835, the radio allocation manager 530 allocates separate RF chains to two MAC components as described above with reference to FIG. 7.

While the home channel is silenced, the scanner 555 scans channels in the same band as the DFS channel for the off channel duration at block 840-*a*. The scanner 555 can utilize the second MAC component RF chain for scanning the channels. At block 840-*b*, the DFS Manager 545 uses the first MAC component to continue radar detection on the DFS home channel. As the DFS home channel has been silenced, there are no transmissions on the DFS channel to disrupt the radar detection. Block 845 illustrates how block 840-*a* and block 840-*b* continue, or are repeated, until the off channel duration expires. That is, the off channel scanning and the DFS home channel radar detection continue for the duration the DFS home channel is silenced. In some cases, the scanning of the DFS home channel and the off channel scanning are synchronized in time.

When the off channel duration expires at block 845, the scanner 555 discontinues scanning channels at block 850. The DCF mode is then entered at block 855 via DCF manager 550. Returning to the DCF mode can include reallocating at least one RF chain back to the first MAC component. In some cases, all of the channels identified by channel identifier 560 in block 825 can take longer to scan than is feasible during the allowed off channel duration. In these cases, the method 800 is repeated, and an additional traffic latency parameter is identified to begin the process of going off channel to scan the remaining channels.

It should be noted that these methods (e.g., method 700 and method 800) describe possible implementation, and that the operations and the steps can be rearranged or otherwise modified such that other implementations are possible. In some examples, aspects from two or more of the methods are combined. For example, aspects of each of the methods can include steps or aspects of the other methods, or other steps or techniques described herein. Thus, aspects of the disclosure provide for Wi-Fi scanning on a DFS master DBS device.

The description herein is provided to enable a person skilled in the art to make or use the disclosure. Various modifications to the disclosure will be readily apparent to those skilled in the art, and the generic principles defined herein can be applied to other variations without departing from the scope of the disclosure. Thus, the disclosure is not to be limited to the examples and designs described herein but is to be accorded the broadest scope consistent with the principles and novel features disclosed herein.

The functions described herein are implemented in hardware, software executed by a processor, firmware, or any combination thereof. If implemented in software executed by a processor, the functions are stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions are often physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium is any available medium that is accessible by a general purpose or special purpose computer. By way of example, and not limitation, non-transitory computer-readable media includes RAM, ROM, electrically erasable programmable read only memory (EEPROM), compact disk (CD) ROM or other optical disk storage, magnetic disk storage or other magnetic storage devices, or any other non-transitory medium that is used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Thus, aspects of the disclosure provide for Wi-Fi scanning on a DFS master DBS device. It should be noted that these methods describe possible implementations, and that the operations and the steps can be rearranged or otherwise modified such that other implementations are possible. In some examples, aspects from two or more of the methods are combined.

The various illustrative blocks and modules described in connection with the disclosure herein are often implemented or performed with a general-purpose processor, a DSP, an ASIC, an FPGA or other programmable logic device, discrete gate or transistor logic, discrete hardware components, or any combination thereof designed to perform the functions described herein. A general-purpose processor includes a microprocessor, but in the alternative, the processor can be any conventional processor, controller, microcontroller, or state machine. A processor is often implemented as a combination of computing devices (e.g., a combination of a digital signal processor (DSP) and a microprocessor, multiple microprocessors, one or more microprocessors in conjunction with a DSP core, or any other such configuration). Thus, the functions described herein are performed by one or more other processing units (or cores), on at least one IC. In various examples, different types of integrated circuits are used (e.g., Structured/Platform ASICs, an FPGA, or another semi-custom IC), which are programmed in any manner known in the art. The functions of each unit are also implemented, in whole or in part, with instructions embodied in a memory, formatted to be executed by one or more general or application-specific processors.

In the appended figures, similar components or features have the same reference label. Further, various components of the same type are distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at an access point, comprising:
    transmitting an instruction to quiet a dynamic frequency selection (DFS) home channel for a specified period of time;
    allocating a first dedicated RF chain to a first media access control (MAC) component of the access point;
    allocating a second dedicated RF chain, separate from the first dedicated RF chain, to a second MAC component of the access point;
    determining a number of channels to scan during the specified period of time based at least in part on the specified period of time and a scan priority associated with each of the channels of the number of channels;
    scanning the home DFS channel using the first dedicated RF chain during the specified period of time; and
    scanning one or more other channels in a same band as the DFS home channel using the second dedicated RF chain during the specified period of time.

2. The method of claim 1, wherein determining the number of channels to scan is further based at least in part on a traffic latency parameter of the DFS home channel.

3. The method of claim 1, wherein allocating the first dedicated RF chain to the first MAC component comprises:
    reducing a number of RF chains allocated to the first MAC component.

4. The method of claim 3, further comprising:
    discontinuing the scanning of the one or more other channels in the same band as the DFS home channel at the end of the specified time frame; and
    reallocating the second dedicated RF chain to the first MAC component.

5. The method of claim 1, further comprising:
    discontinuing data transmissions by the access point on the DFS home channel during the specified time period.

6. The method of claim 1, wherein the instruction is from the group consisting of:
    a quiet information element (IE) and a clear-to-send (CTS) to self frame.

7. The method of claim 1, wherein a scan timing of the home DFS channel and the one or more other channels in the same band as the DFS channel are synchronized.

8. The method of claim 1, further comprising:
returning to a distributed coordination function mode of operation at the conclusion of the specified period of time.

9. An access point for wireless communication, comprising:
means for transmitting an instruction to quiet a dynamic frequency selection (DFS) home channel for a specified period of time;
means for allocating a first dedicated RF chain to a first media access control (MAC) component of the access point;
means for allocating a second dedicated RF chain, separate from the first dedicated RF chain, to a second MAC component of the access point;
means for determining a number of channels to scan during the specified period of time based at least in part on the specified period of time and a scan priority associated with each of the channels of the number of channels;
means for scanning the home DFS channel using the first dedicated RF chain during the specified period of time; and
means for scanning one or more other channels in a same band as the DFS home channel using the second dedicated RF chain during the specified period of time.

10. The access point of claim 9, wherein determining the number of channels to scan is further based at least in part on a traffic latency parameter of the DFS home channel.

11. The access point of claim 9, wherein allocating the first dedicated RF chain to the first MAC component comprises:
reducing a number of RF chains allocated to the first MAC component.

12. The access point of claim 11, further comprising:
means for discontinuing the scanning of the one or more other channels in the same band as the DFS home channel at the end of the specified time frame; and
means for reallocating the second dedicated RF chain to the first MAC component.

13. The access point of claim 9, further comprising:
means for discontinuing data transmissions by the access point on the DFS home channel during the specified time period.

14. The access point of claim 9, wherein the instruction is from the group consisting of:
a quiet information element (IE) and a clear-to-send (CTS) to self frame.

15. The access point of claim 9, wherein a scan timing of the home DFS channel and the one or more other channels in the same band as the DFS channel are synchronized.

16. The access point of claim 9, further comprising:
means for returning to a distributed coordination function mode of operation at the conclusion of the specified period of time.

17. An access point for wireless communication, comprising:
a processor;
memory in electronic communication with the processor; and
instructions stored in the memory and operable, when executed by the processor, to cause the access point to:
transmit an instruction to quiet a dynamic frequency selection (DFS) home channel for a specified period of time;
allocate a first dedicated RF chain to a first media access control (MAC) component of the access point;
allocate a second dedicated RF chain, separate from the first dedicated RF chain, to a second MAC component of the access point;
determine a number of channels to scan during the specified period of time based at least in part on the specified period of time and a scan priority associated with each of the channels of the number of channels;
scan the home DFS channel using the first dedicated RF chain during the specified period of time; and
scan one or more other channels in a same band as the DFS home channel using the second dedicated RF chain during the specified period of time.

18. The access point of claim 17, wherein determining the number of channels to scan is further based at least in part on a traffic latency parameter of the DFS home channel.

19. The access point of claim 17, wherein allocating the first dedicated RF chain to the first MAC component comprises:
reducing a number of RF chains allocated to the first MAC component.

20. The access point of claim 19, wherein the instructions are operable to cause the processor to:
discontinue the scanning of the one or more other channels in the same band as the DFS home channel at the end of the specified time frame; and
reallocate the second dedicated RF chain to the first MAC component.

21. The access point of claim 17, wherein the instructions are operable to cause the processor to:
discontinue data transmissions by the access point on the DFS home channel during the specified time period.

22. The access point of claim 17, wherein the instruction is from the group consisting of:
a quiet information element (IE) and a clear-to-send (CTS) to self frame.

23. The access point of claim 17, wherein a scan timing of the home DFS channel and the one or more other channels in the same band as the DFS channel are synchronized.

24. The access point of claim 17, wherein the instructions are operable to cause the processor to:
return to a distributed coordination function mode of operation at the conclusion of the specified period of time.

25. A non-transitory computer-readable medium storing code for wireless communication at an access point, the code comprising instructions executable by a processor to cause the access point to:
transmit an instruction to quiet a dynamic frequency selection (DFS) home channel for a specified period of time;
allocate a first dedicated RF chain to a first media access control (MAC) component of the access point;
allocate a second dedicated RF chain, separate from the first dedicated RF chain, to a second MAC component of the access point;
determine a number of channels to scan during the specified period of time based at least in part on the specified period of time and a scan priority associated with each of the channels of the number of channels;
scan the home DFS channel using the first dedicated RF chain during the specified period of time; and
scan one or more other channels in a same band as the DFS home channel using the second dedicated RF chain during the specified period of time.

26. The non-transitory computer-readable medium of claim 25, wherein determining the number of channels to scan is further based at least in part on a traffic latency parameter of the DFS home channel.

* * * * *